United States Patent Office 3,121,610
Patented Feb. 18, 1964

3,121,610
PROCESS FOR THE PREPARATION OF AMMONIUM CHLORIDE FROM THE LIQUOR OF AN AMMONIA-SODA PROCESS
Peter McAlpine McLachlan and Michael Neale, Northwich, England, assignors to Imperial Chemical Industries Limited, London, England, a corporation of Great Britain
No Drawing. Filed July 2, 1962, Ser. No. 207,095
Claims priority, application Great Britain July 10, 1961
3 Claims. (Cl. 23—100)

This invention relates to the manufacture of ammonium chloride, particularly to improvements in the known method of making ammonium chloride from the liquors of an ammonia-soda process, whereby better yields are obtained.

In the normal ammonia-soda process for making sodium carbonate a point is reached where the carbonating towers contain a magma composed of sodium bicarbonate suspended in a liquor (hereinafter described as tower liquor) that is mainly a solution of ammonium chloride and sodium chloride saturated with sodium bicarbonate, and also containing small amounts of ammonium carbonate/bicarbonate complexes. A typical tower liquor would contain by weight 19 to 20% $NH_4Cl$, 7 to 8% $NaCl$, 4 to 5% $(NH_4)_2CO_3/NH_4HCO_3$, and 0.5 to 0.7% $NaHCO_3$. This magma is filtered and the liquor returned to the process to be treated with milk of lime in order to recover the ammonia of the ammonium chloride. If it is desired to isolate ammonium chloride as such, some of the tower liquor is diverted and instead of being treated with milk of lime is mixed with an approximately 25% by weight solution of ammonia in water, heated to 35°–40° C. and then saturated at this temperature with sodium chloride by means of additions of solid salt. After this it is cooled to about −11° C. and solid ammonium chloride separates out.

Tower liquor is saturated at ambient temperatures with respect to sodium bicarbonate, and it is important, if a pure ammonia chloride is desired, that there should be no co-precipitation of sodium bicarbonate at lower temperatures. It has consequently always been considered essential to add at some stage to tower liquor, before it is salted and cooled, enough water to prevent the development of supersaturation. This water is normally added in the form of the 25% by weight solution of ammonia hereinbefore referred to, and it also avoids any supersaturation with respect to sodium chloride. Under average conditions of known practice the ammonia concentration of the tower liquor after addition of the 25% by weight solution of ammonia is 2.5% to 3.0% by weight and the carbon dioxide concentration 3.5% to 4.0% by weight.

We have now found that within certain limits an increase in the ammonia and carbon dioxide concentrations of tower liquor, without adding water to prevent supersaturation, has the effect of reducing the solubility of ammonium chloride over the temperature range from ambient temperature down to about −11° C. and hence of increasing its yield, without causing the precipitation of any sodium bicarbonate. This is surprising and unpredictable since tower liquor after salting and cooling is, under these conditions, undoubtedly supersaturated with respect to sodium bicarbonate. The lower limits used herein are the upper limits of 3.0% and 4.0% by weight of ammonia and carbon dioxide, respectively, and the upper limits of the ammonia and carbon dioxide concentrations are respectively 4.5 and 5.4% by weight of tower liquor at 35°–40° C. Further increases in concentration beyond these figures cause the ammonium chloride to be contaminated with a solid phase containing carbon dioxide mainly in the form of sodium bicarbonate.

It is necessary to define what is meant in this specification by ammonia and carbon dioxide concentrations. To determine ammonia concentration a sample of known volume of the liquor is added to a known volume of standard acid that is in excess of that required to neutralise the sample. Using screened methyl orange indicator the excess of acid is back-titrated with standard caustic soda solution. The volume of acid required to neutralise the sample is thus obtained and it is expressed as a weight of equivalent $NH_3$. This weight of $NH_3$ expressed as a percentage of the weight of the sample is the ammonia concentration. To determine carbon dioxide concentration a sample of known volume of the liquor is gently heated with excess hydrochloric acid under water-pump vacuum, and the carbon dioxide evolved is absorbed in excess of barium hydroxide solution. Barium carbonate is precipitated and after neutralisation of excess barium hydroxide using phenolphthalein as indicator the barium carbonate is estimated by titration with standard hydrochloric acid using screened methyl orange indicator. The amount of barium carbonate, $BaCO_3$, is then expressed in terms of the equivalent $CO_2$, and this amount of carbon dioixide expressed as a percentage of the weight of the sample is the carbon dioxide concentration.

Thus, according to our invention a process for making ammonium chloride from tower liquors of an ammonia-soda process as hereinbefore defined, comprises passing dry gaseous ammonia and carbon dioxide into said tower liquors in such amounts that at a temperature of 35°–40° C. the concentration therein of ammonia as hereinbefore defined does not exceed 4.5% by weight, and that of carbon dioxide as hereinbefore defined does not exceed 5.4% by weight, saturating the resulting liquors with sodium chloride at a temperature of 35°–40° C. and then cooling them to about −11° C. and separating ammonium chloride that crystallises therefrom.

Increases in yield achievable by the process of the invention are from 15% to 20%.

In the following examples the first represents average known practice, the second and third illustrate the invention.

Example 1

This example represents known practice. The composition of the tower liquor after being treated with a 25% by weight aqueous solution of ammonia and saturated with sodium chloride at 39° C. is given in column (i) and that of the same liquor after cooling to −11° C. in column (ii).

|  | (i) Percent by weight | (ii) Percent by weight |
|---|---|---|
| $NH_3$ | 2.71 | 2.92 |
| $CO_2$ | 3.53 | 3.71 |
| $NH_4Cl$ | 14.33 | 5.56 |
| $NaCl$ | 16.40 | 18.13 |
| $H_2O$ | 63.03 | 69.68 |

The yield of ammonium chloride expressed as g. per 100 g. liquor saturated with salt was 9.3 g.

Example 2

The composition of the tower liquor after being treated with dry ammonia and carbon dioxide and then saturated with sodium chloride at 39° C. is given in column (i)

and that of the same liquor after cooling to −11° C. in column (ii).

|  | (i) Percent by weight | (ii) Percent by weight |
|---|---|---|
| $NH_3$ | 3.53 | 3.86 |
| $CO_2$ | 4.36 | 4.81 |
| $NH_4Cl$ | 14.85 | 4.47 |
| $NaCl$ | 15.61 | 17.62 |
| $H_2O$ | 61.65 | 69.24 |

The yield of ammonium chloride expressed in the same terms as in Example 1 was 10.9 g., showing an increase of 17.2% over that in Example 1.

*Example 3*

The composition of tower liquor after being treated with dry ammonia and carbon dioxide and saturated with sodium chloride at 39° C. is given in column (i) and that of the same liquor after cooling to −11° C. in column (ii).

|  | (i) Percent by weight | (ii) Percent by weight |
|---|---|---|
| $NH_3$ | 3.92 | 4.31 |
| $CO_2$ | 4.80 | 5.21 |
| $NH_4Cl$ | 14.99 | 4.21 |
| $NaCl$ | 15.33 | 18.40 |
| $H_2O$ | 60.96 | 67.87 |

The yield of ammonia chloride expressed in the same terms as Example 1 was 11.1 g., showing an increase of 19.4% over that in Example 1.

Tower liquor of the same composition was used for each of the three experiments.

What we claim is:

1. A process for making ammonium chloride from a magma composed of sodium bicarbonate suspended in a liquor that is mainly a solution of ammonium chloride and sodium chloride saturated with sodium bicarbonate and containing small amounts of ammonium carbonate/ bicarbonate complexes, comprising passing dry gaseous ammonia and carbon dioxide into said magma in such amounts, without adding water to prevent supersaturation, that at a temperature of about 35° to 40° C. the concentration therein of said ammonia does not exceed about 4.5% by weight, and the concentration of said carbon dioxide does not exceed about 5.4% by weight, saturating the resulting magma with sodium chloride at a temperature of about 35° to 40° C. and then cooling the magma to about −11° C. and separating ammonium chloride that crystallizes therefrom.

2. The process of claim 1 wherein the ammonium chloride crystallizes out without causing the precipitation of any sodium bicarbonate.

3. A process for making ammonium chloride as claimed in claim 1 in which the concentrations by weight of ammonia and carbon dioxide are respectively from 3.0% to 4.5% and from 4.0% to 5.4%.

References Cited in the file of this patent

UNITED STATES PATENTS

| 2,666,686 | Miller et al. | Jan. 19, 1954 |
| 2,843,454 | Devaux et al. | July 15, 1958 |
| 3,014,782 | Arita et al. | Dec. 26, 1961 |

FOREIGN PATENTS

| 131,870 | Great Britain | Feb. 12, 1920 |